(12) United States Patent
Biggers et al.

(10) Patent No.: US 12,531,502 B2
(45) Date of Patent: Jan. 20, 2026

(54) RENEWABLE POWER GENERATION AND STORAGE USING PHOTOVOLTAIC MODULES, SOLAR THERMAL STORAGE, AND BATTERIES

(71) Applicant: Schlumberger Technology Corporation, Sugar Land, TX (US)

(72) Inventors: Evan Biggers, Houston, TX (US); Sandeep Verma, Cambridge, MA (US); Arindam Bhattacharya, Houston, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 18/192,796

(22) Filed: Mar. 30, 2023

(65) Prior Publication Data
US 2023/0353079 A1 Nov. 2, 2023

Related U.S. Application Data

(60) Provisional application No. 63/362,136, filed on Mar. 30, 2022.

(51) Int. Cl.
*H02S 10/10* (2014.01)
*F03G 6/00* (2006.01)
(Continued)

(52) U.S. Cl.
CPC .............. *H02S 10/10* (2014.12); *F03G 6/004* (2021.08); *H02J 7/35* (2013.01); *H02S 10/20* (2014.12); *F24S 10/00* (2018.05)

(58) Field of Classification Search
CPC .......... H02S 10/10; H02S 10/20; F03G 6/004; H02J 7/35; F24S 10/00; F01K 9/003; F01K 25/10; F22B 1/006
See application file for complete search history.

(56) References Cited

U.S. PATENT DOCUMENTS 11,187,212 B1* 11/2021 Bodishbaugh ...... E21B 41/0085
2010/0133850 A1* 6/2010 Winkler .................... F03D 9/25
290/55
(Continued)

FOREIGN PATENT DOCUMENTS

CN 113757058 A * 12/2021 ............. F01K 25/08
EP 2955372 A2 12/2015

OTHER PUBLICATIONS

Kasabian, A. et al., "Solar-driven polygeneration systems: Recent progress and outlook", Applied Energy, 2020, 264, 32 pages.
(Continued)

*Primary Examiner* — Michael Y Sun
(74) *Attorney, Agent, or Firm* — Jeffrey D. Frantz

(57) ABSTRACT

A system for providing electrical power includes a high temperature heat source, an ambient temperature heat sink, an ORC generator, a solar thermal collector, and an SDES device. The ORC generator includes a generator working fluid with a boiling temperature greater than an ambient temperature of the ambient temperature heat sink, and the generator working fluid receives heat from the high temperature heat source and exhausts heat to the ambient temperature heat sink. The solar thermal collector is in thermal communication with the high temperature heat source to heat the high temperature heat source. The solar thermal collector includes a photovoltaic (PV) module, and the solar thermal collector is configured to convert a first portion of sunlight to thermal energy and a second portion of the sunlight to electrical energy. The SDES device receives electrical energy from one of the ORC generator and the PV module.

10 Claims, 8 Drawing Sheets

(51) Int. Cl.
*H02J 7/35* (2006.01)
*H02S 10/20* (2014.01)
*F24S 10/00* (2018.01)

(56) References Cited

U.S. PATENT DOCUMENTS

| | | | |
|---|---|---|---|
| 2011/0204655 A1 | 8/2011 | Waibel | |
| 2011/0277815 A1* | 11/2011 | Sankrithi | F24S 30/425 136/246 |
| 2013/0255752 A1* | 10/2013 | Escher | F24S 23/70 136/248 |
| 2016/0156309 A1* | 6/2016 | Almogy | H01L 31/052 60/641.15 |
| 2021/0336582 A1 | 10/2021 | Lasich | |

OTHER PUBLICATIONS

"Solar Steam Generators", downloaded on Mar. 7, 2025 from the internet [https://www.suncnim.com/en/solar-steam-generators], 2017, 8 pages.

"RayGens Technology", downloade on Mar. 7, 2025 from the internet: [https://raygen.com/technology/], 10 pages.

* cited by examiner

|  | Chilled ORC with Cold Store | | | Air-Cooled with Batteries | |
| --- | --- | --- | --- | --- | --- |
| Chiller T (C) | 4 | 10 | 20 | 35 | 50 |
| Peak PV (MWe) | 4 | 4 | 4 | 4 | 4 |
| Peak Solar Thermal (MW) | 8 | 8 | 8 | 8 | 8 |
| Capacity Factor | 0.3 | 0.3 | 0.3 | 0.3 | 0.3 |
| Thermal to ORC (MW) | 26.4 | 26.4 | 26.4 | 26.4 | 26.4 |
| Thermal Efficiency | 0.115 | 0.109 | 0.089 | 0.070 | 0.051 |
| RTE | 0.651 | 0.625 | 0.510 | 10.840 | 7.912 |
| ORC Pump (kW) | 111 | 108 | 96 | 86 | 85 |
| Chiller Duty (kW) | 4562 | 4462 | 4268 | | |
| Battery Charge (kW) | | | | 4562 | 4562 |
| Total Power In (kW) | 4672 | 4570 | 4364 | 4647 | 4646 |
| Battery Discharge (kW) | | | | 4105 | 4105 |
| ORC Power Output (kW) | 3042 | 2855 | 2227 | 1837 | 1341 |
| Total Power Out (kW) | 3042 | 2855 | 2227 | 5942 | 5446 |
| Overall RTE | 65% | 62% | 51% | 128% | 117% |

FIG. 5

| Working Fluid | Thermal to ORC (MW) | Heat rejection T (°C) | Thermal efficiency |
| --- | --- | --- | --- |
| Ammonia | 26.4 | 4 | 0.112 |
| Pentane | 26.4 | 4 | 0.13 |
| Propylene | 26.4 | 4 | 0.125 |
| Propane | 26.4 | 4 | 0.124 |
| R-134a | 26.4 | 4 | 0.123 |
| R-227ea | 26.4 | 4 | 0.141 |
| Hexane | 26.4 | 4 | 0.095 |

FIG. 6

| Working Fluid | Thermal to ORC (MW) | Heat rejection T (°C) | Minimum P (kPa) | Maximum P (kPa) | ORC RTE | Thermal Efficiency | Power Out (kW) |
| --- | --- | --- | --- | --- | --- | --- | --- |
| Ammonia | 26.4 | 35 | 1554 | 3230 | 10.84 | 0.070 | 1837 |
| Propane | 26.4 | 35 | 1300 | 2600 | 6.48 | 0.076 | 2002 |
| Propylene | 26.4 | 35 | 1500 | 2950 | 6.14 | 0.077 | 2040 |
| n-Butane | 26.4 | 35 | 350 | 1250 | 14.61 | 0.104 | 2754 |
| i-Butane | 26.4 | 35 | 500 | 1650 | 10.75 | 0.104 | 2734 |
| R-134a | 26.4 | 35 | 950 | 2180 | 8.44 | 0.077 | 2024 |
| R-410a | 26.4 | 35 | 2220 | 3900 | 3.317 | 0.066 | 1751 |
| Chlorine | 26.4 | 35 | 1150 | 2400 | 11.27 | 0.079 | 2083 |

FIG. 7

|  | Chiller Cycle | Battery Storage | |
|---|---|---|---|
| Cooling T (C) | 4 | 35 | 50 |
| RTEoverall | 67.2% | 124.2% | 113.3% |
| Hours of ORC Operation | 3.27 | 3.27 | 3.27 |
| ORC Dispatch to Grid (MWh) | 6.7 | 4.0 | 3.0 |
| Battery Dispatch to Grid (MWh) | 0 | 8.2 | 8.2 |
| PV Dispatch to Grid (MWh) | 16.4 | 16.5 | 16.5 |
| Total Energy to Grid (MWh) | 23.1 | 28.7 | 27.6 |
| Hours From Storage (ORC + Battery) | 3.3 | 6.1 | 5.6 |

FIG. 11

RENEWABLE POWER GENERATION AND STORAGE USING PHOTOVOLTAIC MODULES, SOLAR THERMAL STORAGE, AND BATTERIES

CROSS-REFERENCE TO RELATED APPLICATIONS

The present application claims priority to and the benefit of U.S. Provisional Patent Application No. 63/362,136 filed Mar. 30, 2022, titled "RENEWABLE POWER GENERATION AND STORAGE USING PHOTOVOLTAIC MODULES, SOLAR THERMAL STORAGE AND BATTERIES" the disclosure of which is incorporated herein by reference in its entirety.

BACKGROUND

Renewable energy usage is growing rapidly all over the world as humanity tries to decarbonize sources of energy. However, the two most common forms of renewable energy, solar and wind, are intermittent. For these sources to provide a steady amount of energy throughout the day, energy storage is required. Lithium-ion batteries are the most commonly available form of energy storage. However, the cost of this form of storage scales poorly with time. For example, while short-term energy storage with lithium-ion batteries is competitive for two-hours of storage, the costs become prohibitive for intermediate-term (four-six hours) and long-duration energy storage.

SUMMARY

In some embodiments, a system for providing electrical power includes a high temperature heat source, an ambient temperature heat sink, an ORC generator, a solar thermal collector, and an SDES device. The ORC generator includes a generator working fluid with a boiling temperature greater than the temperature of the ambient temperature heat sink, and the generator working fluid receives heat from the high temperature heat source and exhausts heat to the ambient temperature heat sink. The solar thermal collector is in thermal communication with the high temperature heat source to heat the high temperature heat source. The solar thermal collector includes a photovoltaic (PV) module, and the solar thermal collector is configured to convert a first portion of sunlight to thermal energy and a second portion of the sunlight to electrical energy. The SDES device receives electrical energy from one of the ORC generator and the PV module.

In some embodiments, a system for providing electrical power includes a PV module, a high temperature heat source, an ambient temperature heat sink, an ORC generator, and one or more battery energy storage devices. The ORC generator includes a generator working fluid with a boiling temperature greater than the temperature of the ambient temperature heat sink, and the generator working fluid receives heat from the high temperature heat source and exhausts heat to the ambient temperature heat sink. The one or more battery storage devices are configured to receive electricity from the PV module and the ORC generator.

In some embodiments, a method of providing electrical power includes generating PV electrical power with a PV module, providing the PV electrical power to one or more battery storage devices, collecting heat from sunlight; heating a generator working fluid with the heat, generating ORC electrical power in an ORC generator, providing the ORC electrical power to one or more battery storage devices, and cooling the generator working fluid with an ambient temperature heat sink.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and aspects of embodiments of the disclosure will be set forth in the description which follows, and in part will be obvious from the description, or may be learned by the practice of such embodiments. The features and aspects of such embodiments may be realized and obtained by means of the instruments and combinations particularly pointed out in the appended claims. These and other features will become more fully apparent from the following description and appended claims or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, non-schematic drawings should be considered as being to scale for some embodiments of the present disclosure, but not to scale for other embodiments contemplated herein. Understanding that the drawings depict some example embodiments, the embodiments will be described and explained with additional specificity and detail through the use of the accompanying drawings in which:

FIG. 5 is a table illustrating a difference in round-trip efficiency between the simulated system of FIG. 2 and the simulated system of FIG. 3, according to at least some embodiments of the present disclosure;

FIG. 6 is a table illustrating properties of different generator working fluids in a conventional organic Rankine cycle generator, according to at least some embodiments of the present disclosure;

FIG. 7 is a table illustrating properties of different generator working fluids in an organic Rankine cycle generator with an ambient temperature heat sink, according to at least some embodiments of the present disclosure;

FIG. 11 is a table illustrating a comparison of total output of systems for a 24-hour cycle, according to at least some embodiments of the present disclosure.

DETAILED DESCRIPTION

Figure 1:
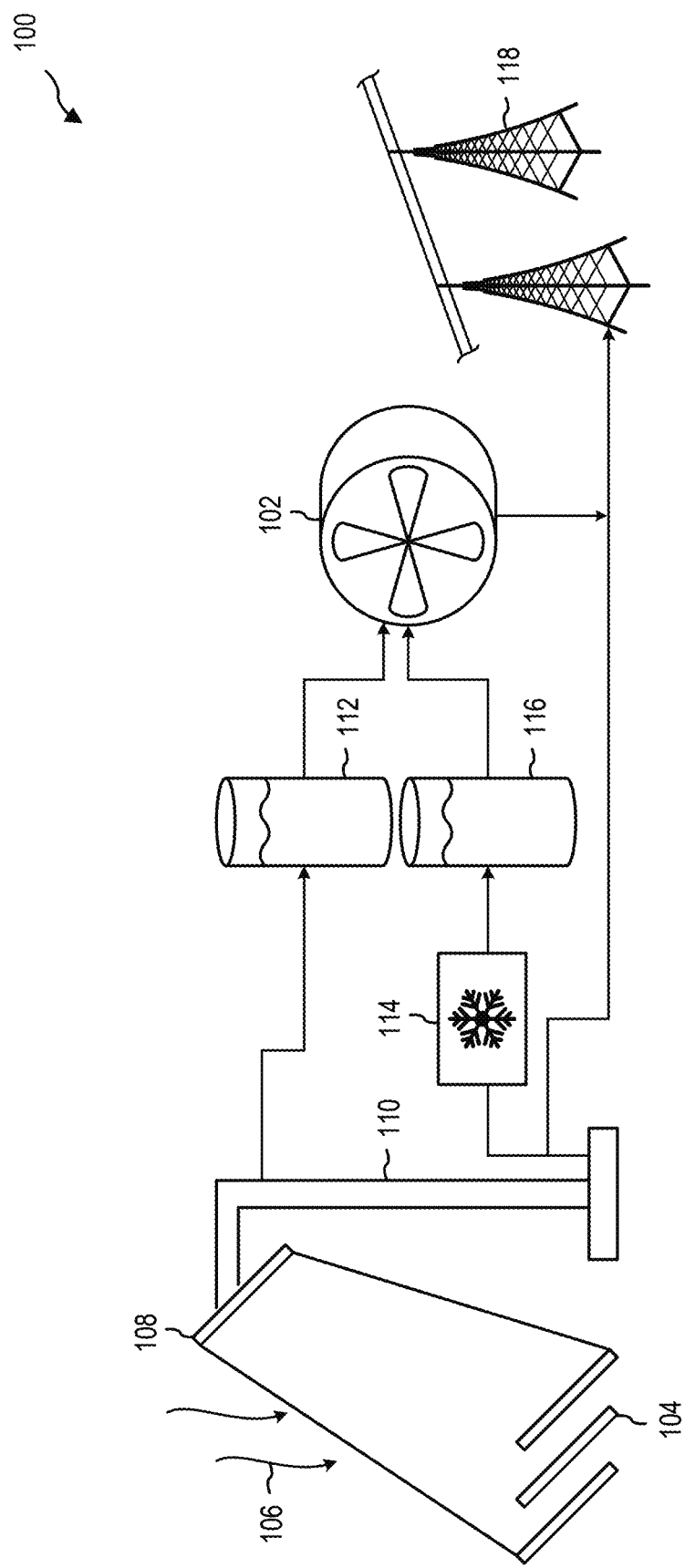
FIG. 1 is a schematic representation of a conventional system for providing power.

Embodiments of the present disclosure generally relate to short-term, intermediate-term and long-duration energy storage. Short-term energy storage is storage of energy (thermal, mechanical, electrical, chemical, etc.) for no more than 4 hours of time. For example, lithium-ion batteries, on a large scale, become economically unviable for storage durations of greater than 4 hours. Lithium-ion batteries are generally used for short-term energy storage. Other forms of energy storage can be more economical on intermediate-term and/or long-term scales. For example, pumped hydrological energy storage allows for the conversion of available energy (such as during periods of sunlight or wind) to gravitational potential energy of a mass of water that is pumped vertically upward, such as to a reservoir uphill or into a tower. Thermal energy storage stores energy as heat and converts a temperature difference to energy through a Rankine cycle.

In some embodiments, systems and methods according to the present disclosure use an organic Rankine cycle (ORC) to convert a temperature difference into energy. An ORC generator uses a difference in temperature to drive a heat-to-power engine through the expansion of a generator working fluid. This engine may be used to provide power to the grid when solar modules are unable to generate power (at night or on cloudy days) or when wind turbines are unable to turn. For example, a generator working fluid has a boiling temperature (and condensation temperature) less than the boiling temperature of water of 100° C. (at one atmosphere pressure), if that is chosen as the hot storage source temperature. In some examples, the generator working fluid is liquid at ambient temperature (and pressure) and boils at a temperature less than the boiling temperature of water (at ambient pressure). Different generator working fluids with different boiling temperatures may be used depending on ambient temperatures at the location of the ORC generator, and choice of the hot storage source temperature. For example, an ORC generator located in Norway may experience ambient temperatures that are lower than experienced by an ORC generator located in Mexico.

An ORC generator converts a temperature differential between a high temperature heat source and a low-temperature heat sink into mechanical energy, which may be converted to electrical energy and exported to a power grid or stored in another form of energy storage, such as a short-term, or long-term storage device. For example, the thermal storage may use a mass of water that is heated (for the high temperature heat source) and a second mass of water that is cooled (for the low-temperature heat sink). For example, a high temperature thermal storage or heat source is maintained at or near the boiling temperature of water (or other fluid) and a low-temperature thermal storage is stored at or near the freezing temperature of water (or other fluid), such as in an ice slurry. In such examples, the temperature difference between the hot water and cold water storage is, therefore, at or near a maximum at atmospheric pressure.

FIG. 1 illustrates such an example of a system 100 including an ORC generator 102. Such a system associates the ORC with a solar energy harvesting system. One or more mirrors 104 direct sunlight 106 onto a solar thermal collector, such raised photovoltaic (PV) modules 108 supported by a PV module tower 110, that are actively cooled by water circulated through the PV module tower 110. The PV modules 108 convert the sunlight 106 to energy with approximately 90% efficiency, with about 30% of the sunlight energy converted to electricity by the PV modules 108 and about 60% converted to heat. The heat is captured by the circulating water stream, and the heat is stored in a nearby water reservoir that is the hot energy storage (HES) 112 or heat source for the ORC generator 102. The PV electricity (or the grid) is used to power a refrigeration system 114 to cool water in a second reservoir that is the cold energy storage (CES) 116. Excess electricity produced by the ORC generator 102 may be used to power a load, for instance sold to power local systems and/or sold to a power grid 118. The two insulated storage reservoirs, HES 112 and CES 116, maintain a temperature difference of approximately 90° C. For example, the temperature difference is approximately equivalent to the efficiency of a pumped hydrological system with a height difference of one kilometer.

Figure 2:
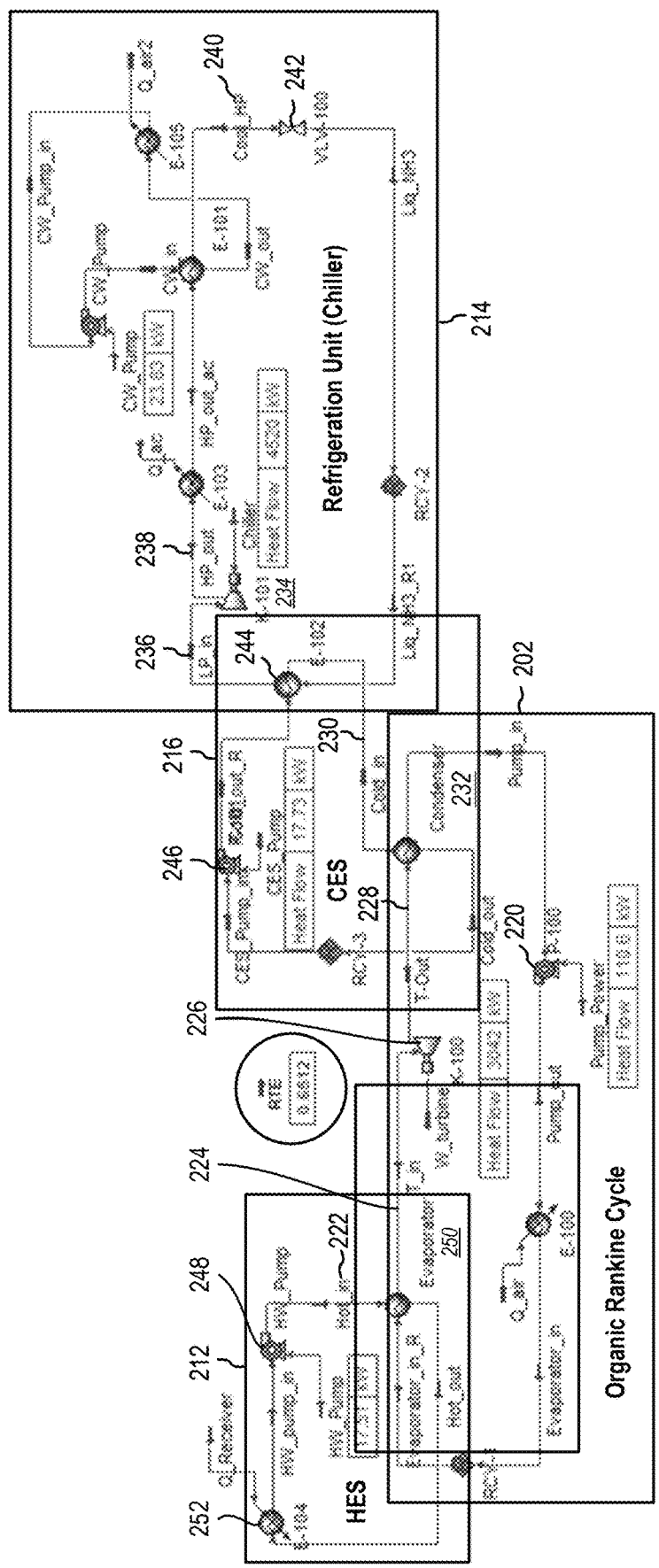
FIG. 2 is a simulation of a system for providing power including a cold energy storage and refrigeration system, according to at least some embodiments of the present disclosure.

FIG. 2 is a simulation diagram for an energy storage aspect of another system including an ORC generator 202. The ORC generator 202 is in thermal and hydraulic communication with an HES 212 and a CES 216 to provide the temperature differential to the ORC generator 202. FIG. 2 represents a steady state process, and in the simulation illustrated, the refrigeration provided by the refrigeration system 214 is matched to the condenser duty in the ORC generator 202. In some embodiments, a generator working fluid is ammonia. In the simulation, ammonia is used as both the generator working fluid and as a refrigeration fluid in the refrigeration system 214.

For the ORC generator 202, Pump P-100 220 using Pump_Power (110.6 kW) increases the pressure of the generator working fluid (e.g., liquid ammonia) stream, which is the outlet stream labeled as Pump_out in FIG. 2. This outlet stream is first heated by ambient air (E-100) and then by a hot water stream (Hot_in) 222 from the HES 212. At this point, the turbine inlet T_in stream 224 is converted into a high-pressure vapor stream. The turbine inlet T_in stream 224 is expanded across expander K-100 226 to extract work (W_turbine=3042 kW). Turbine outlet T_out stream 228 is cool and is condensed by cold water from the CES 216. The Cold_in inlet 230 delivers cold water to the condenser 232. This generator working fluid is condensed in the condenser 232 and forms the inlet stream to the Pump P-100 220 to complete the ORC.

Referring now to the refrigeration system 214, the compressor K-101 234 is used to compress the cool ammonia stream at the low-pressure LP_in inlet 236 using Chiller power of 4520 kW. In some embodiments, the hot high-pressure refrigeration fluid stream at the HP_out outlet 238 is cooled in an air-cooled heat exchanger E-103 and an optional water-cooled heat exchanger E-101 to create the refrigeration fluid stream Cool_HP 240. In some embodiments, the cooling water loop includes a pump CW_Pump (using energy stream CW_Pump=23.83 kW) and air-cooled heat exchanger E-105. The refrigeration fluid stream Cool_HP 240, at saturated conditions, is expanded across a thermo-expansion valve VLV-100 242 into the two-phase region on an ammonia phase diagram. This cold ammonia stream is used to cool the water stored in CES by exchanging heat in the heat exchanger E-102 244.

The cold water loop is shown in the CES 216. In some embodiments, the cold water loop includes a pump P-101 246 to offset the pressure drop in heat exchangers E-102 244 and the condenser 232. In some embodiments, the pump P-101 246 uses energy CES_Pump (=17.73 kW). In some embodiments, the hot water loop is in the HES 212. In some embodiments, the hot water loop comprises a pump HW_Pump 248 using an energy stream HW_Pump (=17.51 kW) to offset the pressure drop in heat exchanger Evaporator 250 and heat exchanger E-104 252.

Round-trip efficiency (RTE) for the ORC is defined as electric power generated by the ORC divided by total electric power used. This number is calculated based on a ratio of the turbine power output in watts to the total power consumed by other pumps and compressors in the system:

$$RTE = W\_turbine/(HW\_Pump+Pump\_Power+Chiller+CW\_Pump+CES\_Pump)$$

The RTE for the simulated embodiment illustrated in FIG. 2 equals 0.6512, as shown in the red circle in FIG. 2. The RTE represents the relative amount of energy extracted from this storage cycle, based on a unit of electric power input into the cycle. For example, for lithium-ion batteries, a typical RTE is around 0.8 (to 0.9), meaning for every kWh of energy used to charge lithium-ion batteries, around 0.8 (to 0.9) kWh may be extracted. The round-trip efficiency for the simulated embodiment is a function of ambient conditions, HES storage temperature, CES storage temperature, adiabatic efficiency of turbine K-100 226 and compressor K-101 234, choice of fluids for the cycles, and operating pressures and temperatures for the two thermodynamic cycles (amongst other variables). An increase in RTE is desirable for any energy storage process. In fact, a high RTE and availability of energy for an extended period of time are the primary metrics used for development of a successful storage process.

As described herein, the RTE is based at least partially on the temperature difference between the HES storage temperature and the CES storage temperature. Reducing the temperature difference reduces the RTE, which is undesirable. In the illustrated and described simulation of FIG. 2, the additional power consumption of the refrigeration system 214 to cool the water of the CES 216 sufficiently improves the RTE, thereby justifying the need for the refrigeration system 214. However, in some embodiments, such as those described herein, it may be desirable to replace the CES 216 with an ambient temperature heat sink that reduces the temperature difference between the heat source and heat sink for the ORC generator 202. Using an ambient temperature heat sink reduces the turbine output (e.g., power output of the turbine K-100 226 of FIG. 2). However, without the power consumption of the refrigeration system 214 and/or the pump P-101 246 of the CES 216, the system RTE value may exhibit a net increase. Further, without the thermal mass of the water of the CES 216, a power plant or other facility may have available space or volume for an increase in the hot water thermal mass of the HES 212. The replacement of the refrigeration system 214 and CES 216 with additional HES 212 hot water thermal mass can increase the overall net power and energy output of the system. Additionally, it can provide energy storage solutions for short, intermediate, and long duration storage.

Figure 3:
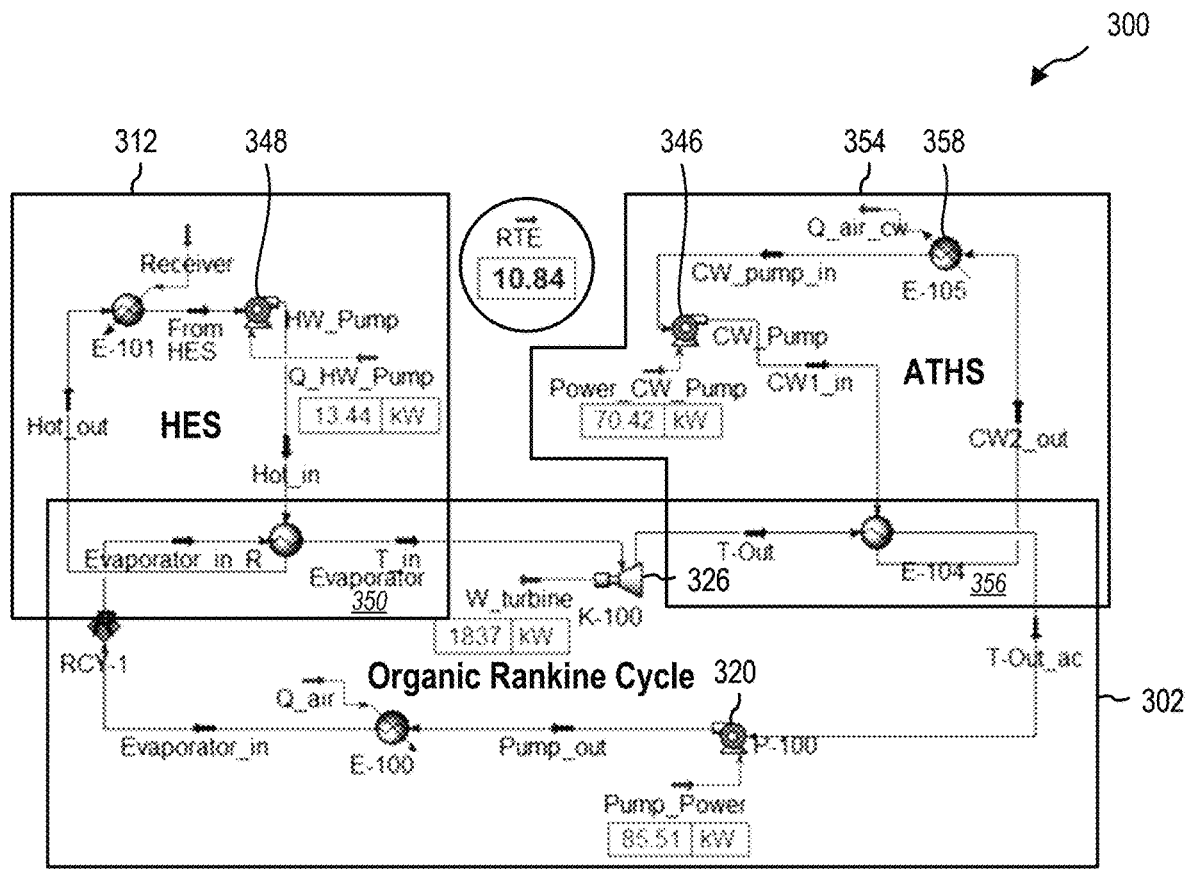
FIG. 3 is a simulation of a system for providing power including an ambient temperature heat sink, according to at least some embodiments of the present disclosure.

In FIG. 3, a simulation (similar to that of FIG. 2) illustrates an embodiment of a portion of system including an ORC generator 302, an HES 312, and an ambient temperature heat sink 354. The embodiment of a portion of a system illustrated in FIG. 3 lacks a refrigeration system and CES. In some embodiments, removal or exclusion of the refrigeration system and CES simplifies the process while improving the overall RTE. In some examples, simplifying the operations of the system may have additional benefits, such as reduced construction costs, reduced maintenance costs, reduced downtime, and reduced operating costs.

The simulation of FIG. 3 exhibits a reduction in the power output of the turbine K-100 326, from the 3042 kW of the turbine K-100 226 of FIG. 2 to the 1837 kW simulated for the system 300 of FIG. 3. However, the RTE calculations reduce to:

$$RTE = W\_turbine/(HW\_Pump+Pump\_Power+CW\_Pump)$$

producing an overall increase in RTE to 10.84 from the RTE of 0.6512 of the system of FIG. 2.

In the embodiment of FIG. 3, an exchanger E-104 356 transfers heat from the generator working fluid of the ORC generator 302 to the ambient fluid, which then exhausts heat to the atmosphere via an exhaust exchanger E-105 358 in the ambient temperature heat sink 354. In some embodiments, heat exchanger E-104 356 may be air-cooled, eliminating the need for the cooling water loop, exchanger E-105 358 and pump CW_Pump 346. In other examples, the heat may be captured and/or recycled to provide additional heating elsewhere, such as additional heating of the HES 312 and/or heating of structures or facilities. Some examples may use additional heating of stream T_in using waste heat from the system to improve the RTE and the power generated in turbine K-100 326.

Figure 4:
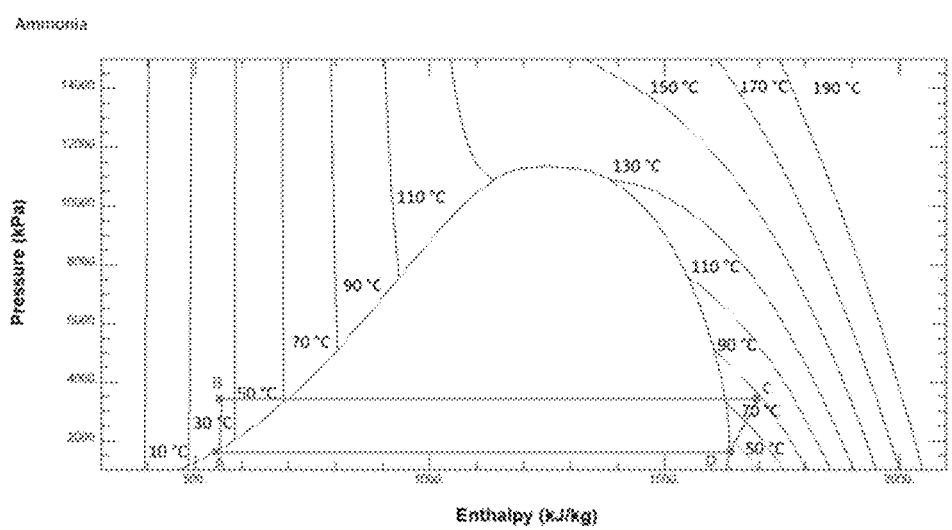
FIG. 4 is a state diagram illustrating a Rankine cycle, according to at least some embodiments of the present disclosure.

In some embodiments, ammonia is the generator working fluid, although a plurality of fluids such as freons and other gases may be used at appropriate pressure/temperature conditions. FIG. 4 shows the Pressure-Enthalpy (P-H) diagram for ammonia with the states A, B, C, D depicting the ORC. State A corresponds to the Pump P-100 inlet stream, which has been condensed to a liquid stream of generator working fluid. Some embodiments of systems according to the present disclosure use an ambient temperature heat sink (such as the ambient temperature heat sink 354 of FIG. 3) for condensing the generator working fluid, and a pressure of the generator working fluid is increased to 1534 kPa to achieve saturated liquid conditions. State B represents the Pump P-100 320 outlet stream of generator working fluid illustrated in FIG. 3. This stream is heated and vaporized in a heat exchanger 350 heated by a recirculating stream from the HES 312 (or the solar thermal receiver) to State C on the phase diagram of FIG. 4. State C represents superheated vapor. While FIG. 4 illustrates State C at approximately 90° C., in some embodiments, State C is located at a higher temperature. For example, an ammonia stream heated to 120° C. may allow more energy to be withdrawn from the generator working fluid via the ORC generator 302, as a larger temperature difference is present in the ORC generator 302. In some embodiments, the generator working fluid is expanded across turbine K-100 326 to extract power W_turbine (=1837 kW). In the simulated embodiments, the power extracted from this cycle is less than the cycle that uses both HES and CES describe in relation to FIG. 2. In some embodiments, such as those simulated in FIG. 2, using both HES and CES allows for a temperature differential of 70-90° C. Using only HES and using ambient conditions for cooling as disclosed in FIG. 3 allows for a temperature differential of 30-50° C. Power extracted from an ORC is directly proportional to the temperature difference in the ORC, and therefore turbine K-100 326 produces less power.

However, if we consider the power input to the process, it is significantly smaller in the proposed ORC shown in FIG. 3. Because we do not use a refrigeration system and CES (such as refrigeration system 214 and CES 216 described in relation to FIG. 2), the total power input is only the power used to operate the pump P-100 320, the cooling water pump CW_Pump 346, and the hot water pump HW_Pump 348, for a total power input of 169.4 kW. Because of the low power consumed by embodiments of the system and process of the present disclosure, the RTE of the ORC equals 10.84, or higher by at least an order of magnitude over the previous simulated process.

In addition to the RTE of the ORC generator 302 of FIG. 3 and associated components, it can also be beneficial to investigate the thermal efficiency of the ORC as well as the overall RTE. ORC Thermal Efficiency is defined as the electric power generated divided by the total thermal input into the system (W_Turbine/Q_Receiver). Overall RTE is defined as the total electric power generated (including ORC as well as any other energy source, such as batteries) divided by total electric power input. In the base case including a CES, this is equivalent to ORC RTE as there is no dedicated battery storage.

There are further benefits to an ORC generator and system with no CES and a refrigeration system in addition to the increase in ORC RTE. In some embodiments, no power is diverted to a CES and a refrigeration system, the chiller duty in the base case can instead be used to charge batteries (or any other efficient short-duration energy storage device). Compared to the simulated embodiment described in relation to FIG. 2, power used in the chiller (up to 4562 kW) may be diverted to a short-duration energy storage (SDES) device or system, which can be used for high efficiency (>80%) short-term storage. For example, the SDES is configured or intended to store energy for less than 4 hours before discharging. At durations greater than 4 hours, intermediate-duration and long-duration storage, such as the thermal storage described herein, becomes more efficient. In some embodiments, the SDES includes mechanical storage technologies (storing mechanical energy, such as potential or kinetic energy) like flywheels and any gravity-based energy storage technologies, any battery chemistry including but not limited to Li-ion batteries, Ni—$H_2$, redox flow batteries, Na-ion batteries, metal-air batteries and organic batteries, any heat to power conversion technologies. In some embodiments, the SDES includes any energy storage device, mechanism, system, or scheme that provides an RTE greater than provided by generating electrical power from the ORC generator with an HES and a CES or chiller. For example, the SDES may be any energy storage device, mechanism, system, or scheme that provides an RTE greater than 0.65.

While there are decreases in ORC thermal efficiency due to a smaller temperature difference, the ORC generator 302 with an ambient temperature heat sink 354 generates 1837 kW as needed, or 60% of the simulated embodiment described in relation to FIG. 2 using a CES and a refrigeration system. However, the energy used to charge the SDES is also available to be discharged. Considering the battery storage as well allows the hybrid model (thermal storage and battery storage) to provide a possible 5942 kW of power compared to 3042 kW, with an Overall RTE of 128% compared to 65.1% such as presented in the chart of FIG. 5.

In some embodiments, the generator working fluid is ammonia, as described in relation to FIG. 4. However, in some embodiments, the generator working fluid is a different fluid with a critical temperature and pressure such that State C (such as described in FIG. 4) is a higher pressure and superheated condition such that State D falls on the saturated vapor line. FIG. 6 illustrates a plurality of embodiments of generator working fluids with sufficient thermal efficiencies for use in a system with a CES and HES, such as described in relation to FIG. 2. When the relatively higher temperature of the ambient temperature heat sink according to some embodiments of the present disclosure is considered, different fluids would be applicable for an ORC generator according to the present disclosure, as illustrated in FIG. 7. For example, while ammonia has the highest thermal efficiency for an ORC generator operating between approximately 90° C. and approximately 4° C., n-butane and i-butane have the greatest thermal efficiency when the lower temperature bound (i.e., Heat rejection T) of the ORC is considered to be approximately 35° C.

Additionally, while embodiments including water as the thermal storage of the HES have been simulated and described herein, in some embodiments, selecting a thermal storage fluid in the HES other than water as the storage medium may allow the HES to operate at temperatures higher than 100° C. Selecting a thermal storage fluid other than water may enable further improvements in the thermodynamic efficiency (RTE) of the process, to be balanced with potential additional costs and constraints.

Figure 8:
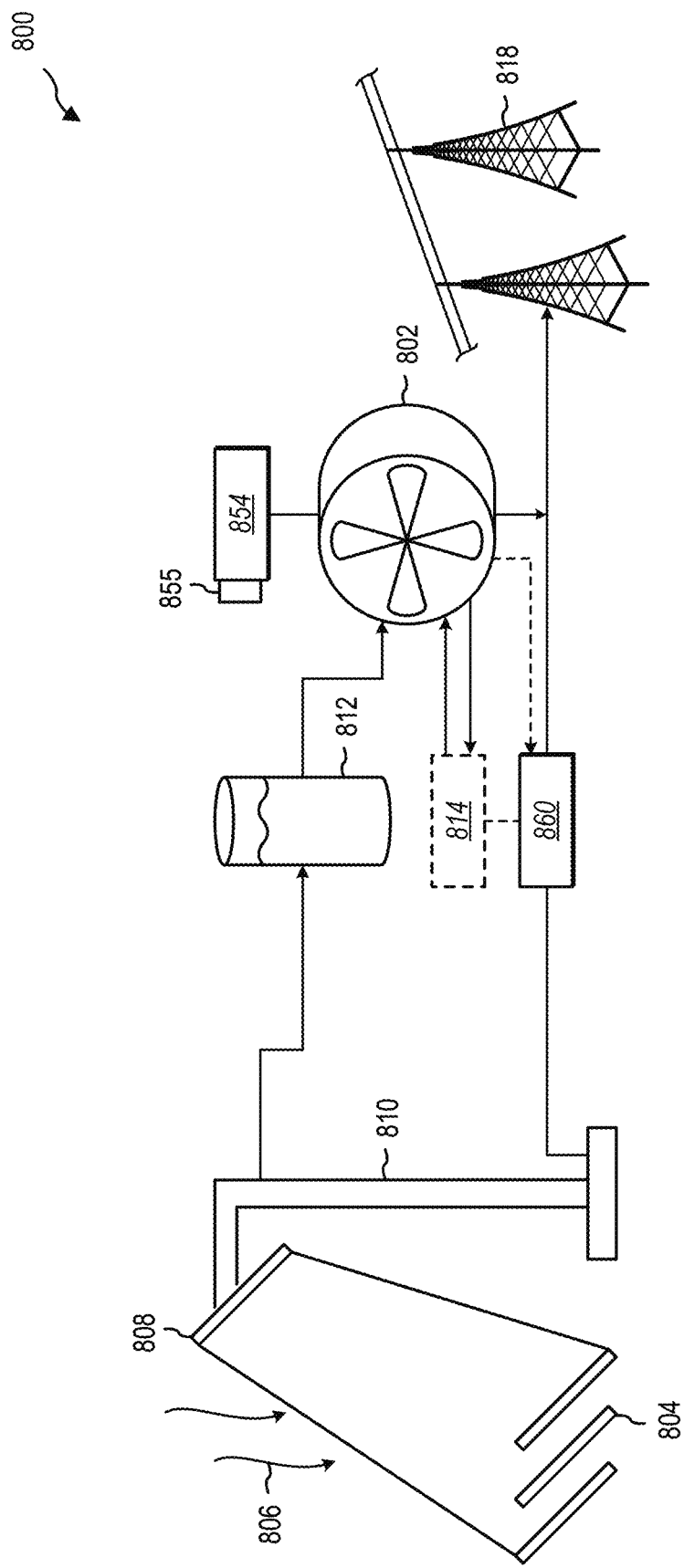
FIG. 8 is a schematic representation of a hybrid system for providing power with a battery storage device, according to at least some embodiments of the present disclosure.

FIG. 8 is a schematic illustration of a system 800 including a battery storage device, such as a plurality of lithium-ion battery cells or other rechargeable electrical storage battery chemistries. For example, Ni—$H_2$ battery cells may exhibit longer-term storage viability than lithium-ion battery cells, while remaining shorter-term storage than thermal storage systems described herein. Any short duration energy storage technology can be used. Such short duration energy storage technology has preferably a RTE higher than 0.65. These include mechanical storage technologies like flywheels, any battery chemistry including but not limited to Li-ion batteries, Ni—$H_2$, redox flow batteries, Na-ion batteries, metal-air batteries and organic batteries, any heat to power conversion technologies, and any gravity-based energy storage technologies.

In some embodiments, one or more mirrors 804 direct sunlight 806 onto a solar thermal collector, such as PV modules 808 supported by a PV module tower 810 that are actively cooled by a storage fluid circulated through the PV module tower 810. The PV modules 808 convert the sunlight 806 to energy with approximately 90% efficiency, with about 30% of the sunlight energy converted to electricity by the PV modules 808 and about 60% converted to heat. The heat is captured by the circulating water stream, and the heat is stored in a nearby water reservoir that is the HES 812 or heat source for the ORC generator 802. This configuration is one configuration enabling to provide electricity and heat from renewable (in particular solar) source of energy. However, any other configuration enabling to provide electricity and heat from renewable source of energy is part of the present disclosure. For instance, the mirrors and tower may be replaced by conventional PV coupled with a heat exchange to recover heat from such solar panels. The electricity generated by the PV modules 808 is delivered to a battery storage device 860 and/or delivered to a power grid 818 as demanded. In some embodiments, the ORC generator 802 converts the heat from the HES 812 to electricity and exhausts heat to an ambient temperature heat sink 854. The electricity from the ORC generator 802 can be delivered to the power grid 818 and/or stored in a battery storage device 860. In some embodiments, the ORC generator 802 and the PV modules 808 provide electricity to the same battery storage device 860. In some embodiments, the electricity produced by the ORC generator 802 is stored in a different battery storage device 860 than the electricity directly produced by the PV modules 808. For example, the ORC generator 802 stores electricity in a generator battery storage device that is distinct from the battery storage device 860 configured to receive electricity from the PV module(s) 808. As described above, the storage of electricity in a rechargeable battery storage device 860 may store and discharge electricity more efficiently (for instance, for short-term storage) than storage and conversion of thermal energy to electricity.

In some embodiments, the system 800, optionally, includes a refrigeration system 814 that can additionally cool generator working fluid beyond the ambient temperature. For example, the refrigeration system 814 may include an electric refrigeration or chiller system, such as a Peltier cooler, that receives electricity from the battery storage device 860 to cool generator working fluid on-demand. In some embodiments, the thermal efficiency and RTE decrease when ambient temperature heat sink increases in temperature, for example, from 35° C. to 50° C. In at least one example, a high ambient temperature, such as during a sunny afternoon during Summer, may limit the thermal efficiency of the ORC generator 802, and cooling the generator working fluid beyond the ambient temperature on-demand may increase the efficiency of the ORC generator 802. In other examples, demand of the power grid 818, power output of the PV module(s) 808, a state of charge (SOC) of the battery storage device 860, or combinations thereof may provide a surplus of electricity at or to the battery storage device 860 and the refrigeration system 814 may receive electricity to cool the generator working fluid of the ORC generator 802.

In some embodiments, the ambient temperature heat sink 854 may include a thermal mass, such as an ambient water thermal mass through which a heat exchanger can cool the generator working fluid to the ambient temperature. In such an embodiment, the refrigeration system 814 may use electricity to cool an ambient water thermal mass of the ambient temperature heat sink 854 to increase the efficiency of the ORC generator 802. For example, the excess electricity may be, thereby converted to thermal energy and the thermal mass of the ambient temperature heat sink 854 may act as a temporary CES. In other examples, the refrigeration system 814 may use electricity to cool an ambient water thermal mass of the ambient temperature heat sink 854 to increase the efficiency of the ORC generator 802 during conditions with a high ambient temperature. While the system 800 will operate with the generator working fluid at or above ambient temperature, a refrigeration system 814 that can selectively cool the generator working fluid and/or an ambient water thermal mass of the ambient temperature heat sink 854 may improve thermal efficiency in select scenarios.

In some embodiments, an ambient temperature sensor 855 measures an ambient temperature. For example, the ambient temperature sensor 855 is an environmental sensor that measures an ambient temperature of the environment to which the ambient temperature heat sink 854 exhausts heat. In another example, the ambient temperature sensor 855 is a heat sink temperature sensor configured to measure an ambient temperature of the ambient temperature heat sink 854. The refrigeration system 814, in some embodiments, cools the ambient water thermal mass of the ambient temperature heat sink 854 based at least partially on a temperature measurement from the ambient temperature sensor 855. For example, the refrigeration system 814 may cool the ambient water thermal mass to keep the ambient water thermal mass below a threshold value when a weather forecast indicates a temperature will increase during the day. In such examples, the PV modules may produce electricity during the day, and the refrigeration system 814 may use a portion of the electricity produced during the day to cool the ambient water thermal mass such that the ambient water thermal mass remains at or below an overnight temperature. The refrigeration system 814, in some embodiments, cools the generator working fluid based at least partially on a temperature measurement from the ambient temperature sensor 855. For example, when a measurement from the ambient temperature sensor 855 of the environmental ambient temperature increases beyond a threshold value, the refrigeration system 814 may begin cooling the generator working fluid beyond the ambient temperature, as the ambient temperature heat sink 854 will only cool the generator working fluid to the environmental ambient temperature.

Figure 9:
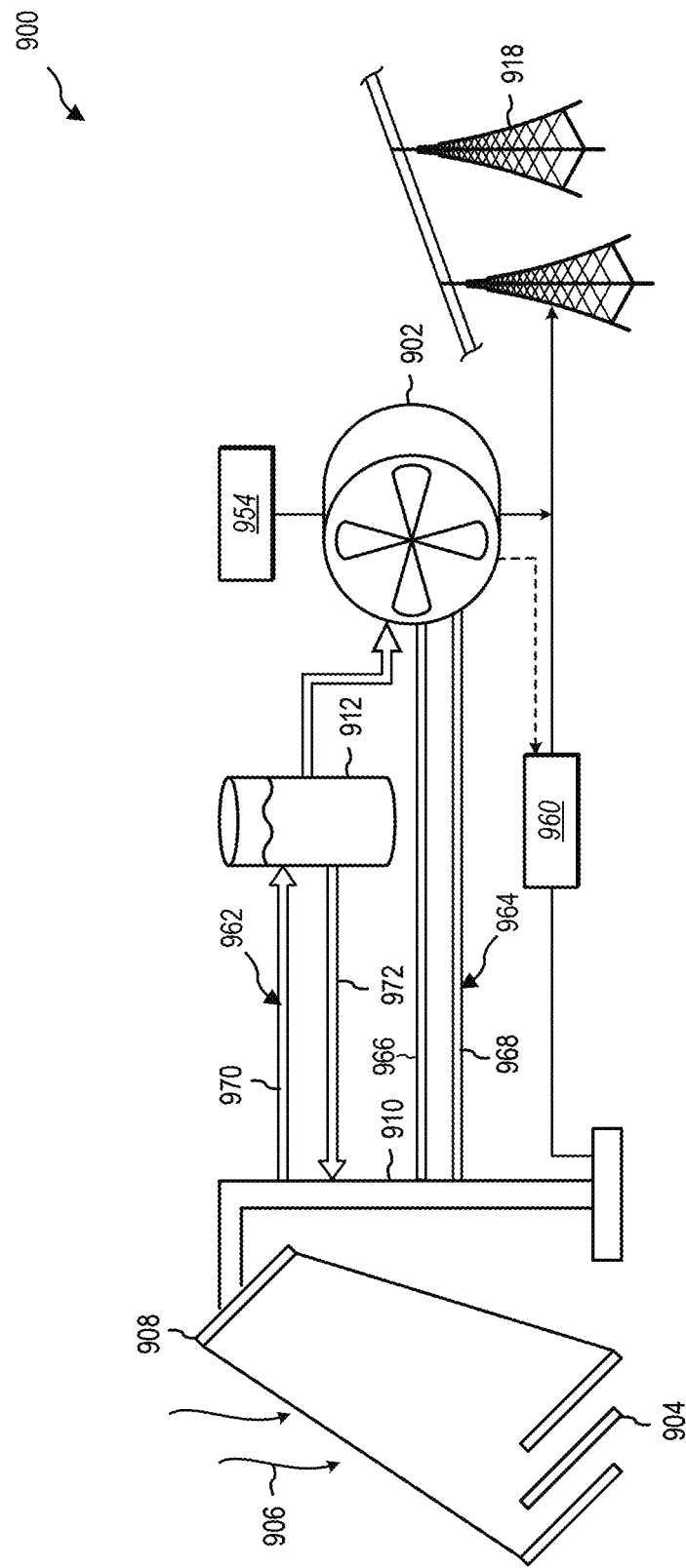
FIG. 9 is a schematic representation of a hybrid system for providing power including direct heating of generator working fluid, according to at least some embodiments of the present disclosure.

FIG. 9 is a schematic representation of a system 900 including direct heating of generator working fluid in a PV module tower. One or more mirrors 904 direct sunlight 906 onto raised PV modules 908, that are actively cooled by thermal storage fluid 962 circulated through the PV module tower 910 and/or generator working fluid 964 circulated through the PV module tower 910. The PV modules 908 convert the sunlight 906 to energy with approximately 90% efficiency, with about 30% of the sunlight energy converted to electricity by the PV modules 908 and about 60% converted to heat. The electricity generated by the PV modules 908 is delivered to a battery storage device 960 and/or delivered to a power grid 918 as demanded. In some embodiments, the heat is captured by the circulating thermal storage fluid 962, and the heat is stored in a nearby water reservoir that is the HES 912 or heat source for the ORC generator 902. In some embodiments, the generator working fluid 964 used in the ORC generator 902 is circulated directly to the PV module tower 910 or another solar receiver to cool the PV module tower 910 or another solar receiver. The generator working fluid 964 receives heat directly from the PV module tower 910 or another solar receiver to heat the generator working fluid to temperatures limited only by the stability of the PV module 908. In some embodiments, the ORC generator 902 converts the heat from the generator working fluid 964 to electricity and exhausts heat to an ambient temperature heat sink 954.

In some embodiments, the system 900 and/or ORC generator 902 is selectively operated in two modes—a first mode with higher temperatures and pressures at State C (such as described in relation to FIG. 4) and resultant higher RTE; and a second mode, when the thermal storage fluid 962 in the HES 912 is used to provide heat to operate the ORC generator 902. In some examples of the first mode, a first generator working fluid conduit 966 and/or second generator working fluid conduit 968 includes a valve or other selectively actuatable control that selectively allows the system 900 to circulate generator working fluid 962 directly to the PV module 908 and/or PV module tower 910 to heat the generator working fluid 962. For example, the first generator working fluid conduit 966 includes a valve or other selectively actuatable control that selectively allows the system 900 to circulate cold generator working fluid through the first generator working fluid conduit 966 to the PV module tower 910, and the second generator working fluid conduit 968 includes a valve or other selectively actuatable control that selectively allows the system 900 to circulate hot generator working fluid through the second generator working fluid conduit 968 to extract heat from the PV module tower 910 and carry the heat to the ORC generator 902.

Similarly, in some examples, a first storage conduit 970 and second storage conduit 972 includes a valve or other selectively actuatable control that selectively allows the thermal storage fluid 964 to circulate through the first storage conduit 970, the PV module tower 910, and the second storage conduit 972 to extract heat from the PV module tower 910 and carry the heat to the HES 912. In at least one embodiment, the system 900 includes a controller that selectively actuates the valves and/or other selectively actuatable controls in the fluid conduits based at least partially on an ambient temperature sensor (such as the ambient temperature sensor 855 described in relation to FIG. 8).

Figure 10:
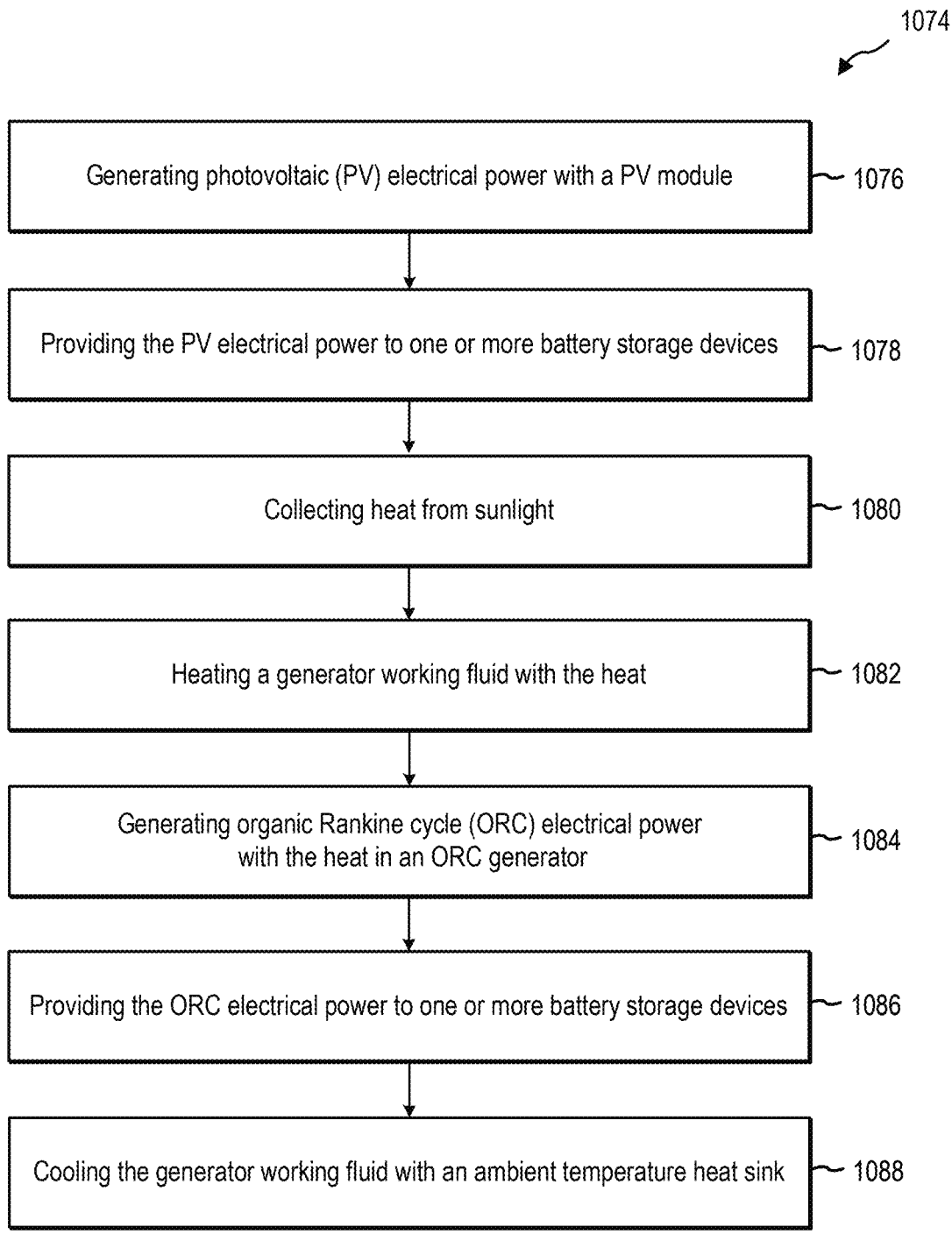
FIG. 10 is a flowchart illustrating a method of providing electrical power, according to at least some embodiments of the present disclosure.

FIG. 10 is a flowchart illustrating an embodiment of a method 1074 of providing electrical power. In some embodiments, the method 1074 includes generating PV electrical power with a PV module from sunlight at 1076 and providing the PV electrical power to one or more battery storage devices, such as described herein, at 1078. The method 1074 also includes collecting heat from the sunlight at 1080. The heat is used in heating a generator working fluid at 1082, such as described in relation to FIG. 3, FIG. 8, or FIG. 9. For example, the heat may be collected and used to heat a high temperature heat source, such as described in relation to FIG. 3 and/or FIG. 8. In other examples, the heat may be collected and used to heat the generator working fluid directly by circulating at least a portion of the generator working fluid through the PV module or a support of the PV module (such as the PV module tower) as described in relation to FIG. 9.

In some embodiments, the method 1074 includes generating ORC electrical power with the heat in an ORC generator at 1084, such as described herein. In some embodiments, the generator working fluid is heated to more than 100° C. In some embodiments, the generator working fluid is heated to between 70° C. and 100° C. The ORC electrical power that is generated by the ORC generator is, in some embodiments, provided to the one or more battery storage devices at 1086. In some examples, the ORC electrical power and the PV electrical power are provided to the same battery storage device. In some examples, the ORC electrical power is provided to an ORC battery storage device and the PV electrical power is provided to a PV battery storage device.

The method 1074 further includes cooling the generator working fluid with an ambient temperature heat sink at 1088. In some embodiments, the ambient temperature heat sink rejects heat from the generator working fluid to the surrounding atmosphere. In some embodiments, the ambient temperature heat sink rejects heat from the generator working fluid to an ambient temperature thermal mass, such as an ambient water thermal mass. For example, an ambient temperature thermal mass may allow a greater thermal conductivity from the generator working fluid to exhaust the heat. As water (or other liquids) provide more efficient thermal conductivity and a larger thermal mass than air, an ambient water thermal mass or other ambient temperature thermal mass may cool the generator working fluid more efficiently. In some embodiments, the ambient temperature thermal mass can subsequently provide a larger surface area to further exhaust the heat to the atmosphere.

In some embodiments, the ambient temperature thermal mass can further limit temperature fluctuations in the ambient temperature heat sink, such as during a daily cycle of day to night and back to day. In some examples, the ambient temperature of the land or atmosphere surrounding the heat sink and/or ORC generator may vary by 30° C. or more, which can result in different RTE and overall thermal efficiency of the ORC generator throughout the daily cycle. In some examples, a temperature of an ambient water thermal mass or other ambient temperature thermal mass may fluctuate less than the surrounding atmosphere, providing a more predictable temperature difference for the ORC generator.

In some examples, the ambient temperature is the atmospheric ambient temperature surrounding the system. In some examples, the ambient temperature is approximately an average ambient temperature, such as when the local weather experiences daily temperature cycles. In such instances, the ambient temperature heat sink may remain at an approximately average temperature of the ambient temperature fluctuations, such as remaining at 30° C. while the ambient temperature of the local weather of the heat sink and/or ORC generator ranges from 20° C. to 40° C. through a 24-hour cycle.

As described herein, a system including both an ORC generator configured to convert thermal energy to electrical energy and a SDES, such as a battery energy storage system, can provide a greater overall efficiency than an ORC generator with a chiller. In some embodiments, the system includes a solar thermal collector, an ORC generator, and PV modules, such as described in relation to FIGS. 8 and 9. In some examples, a portion of the PV electrical power generated by the PV modules is directed to an SDES for later discharge and a portion of the thermal energy collected by the solar thermal collector is directed to a high temperature storage device.

FIG. 11 is a comparison of the total electrical power produced by an embodiment of a system including a chiller ("chiller system") and an embodiment of a system including an SDES and ambient temperature heat sink ("battery system"), according to the present disclosure, in a 24-hour cycle. The simulation assumes the energy storage (thermal storage and/or battery storage) to be depleted at the start of the 24-hour cycle. In the simulation used to calculate the values of FIG. 11, the systems include the same PV modules and the same solar thermal collectors with high temperature storage devices. The simulation compares a system with a refrigeration system that cools a heat sink and/or cold energy storage to 4° C. with systems using ambient temperature heat sinks at 35° C. and 50° C. The simulated systems have $RTE_{overall}$ values similar to those described in relation to FIG. 5.

In the illustrated embodiment, the grid connection to the regional power grid is fixed at 2 MW for all the systems, for examples using battery storage, the portion of the PV electrical power used to operate the chiller and associated pumps of the chiller system is otherwise directed to SDES (e.g., the battery energy storage device) of the battery systems. The solar thermal collection is simulated as equal between the chiller system and the battery systems, and the Hours of ORC Operation are assumed to be equal between the systems. The ORC Dispatch to Grid is the total ORC electrical power produced during the Hours of ORC Operation. As the chiller system is more efficient during the ORC operation due to the larger temperature difference than the battery systems, the ORC Dispatch to Grid value is greater for the chiller system. However, RTE of the battery energy storage device is higher than the ORC (using a chiller), and the lower ORC Dispatch to Grid values of the battery systems are more than compensated for by the Battery Dispatch to Grid of the battery systems (which does not exist for the chiller system).

As the thermal storage and SDES are useable after the PV modules cannot continue producing PV electrical power, such as during night or during adverse weather, the relative gains of the SDES of the battery system(s) compared to the cold energy storage of the chiller system can be understood as additional hours of operation of the system beyond the PV electrical power of the PM modules. For example, the cold energy storage of the chiller system allows for 3.3 Hours from Storage of additional energy production of the chiller system, while the ORC generator with an ambient temperature heat sink and SDES allow for 6.1 Hours from Storage (an increase of 2.8 hours) of additional energy production at 35° C. and 5.6 Hours from Storage (an increase of 2.3 hours) of additional energy production at 50° C. The battery systems produce 5.6 MWh and an extra 4.5 MWh in the simulated 24-hour cycle, respectively, more than the chiller system.

The present disclosure relates to systems and methods for providing electrical power according to any of the following:

[A1] In some embodiments, a system for providing electrical power includes a high temperature heat source, an ambient temperature heat sink, an ORC generator, a solar thermal collector, and an SDES device. The ORC generator includes a generator working fluid with a boiling temperature greater than an ambient temperature of the ambient temperature heat sink, and the generator working fluid receives heat from the high temperature heat source and exhausts heat to the ambient temperature heat sink. The solar thermal collector is in thermal communication with the high temperature heat source to heat the high temperature heat source. The solar thermal collector includes a photovoltaic (PV) module, and the solar thermal collector is configured to convert a first portion of sunlight to thermal energy and a second portion of the sunlight to electrical energy. The SDES device receives electrical energy from one of the ORC generator and the PV module.

[A2] In some embodiments, the high temperature heat source of [A1] is a high temperature thermal storage.

[A3] In some embodiments, the short-duration energy storage device of [A1] is a battery storage device comprising at least a battery cell configured to receive electrical energy from the ORC generator. In some embodiments, the battery includes one or more of a Lithium-ion (Li-ion) battery, nickel-hydrogen (Ni—H$_2$) battery, redox flow battery, Sodium-ion (Na-ion) battery, metal-air batteries and organic batteries

[A4] In some embodiments, the battery storage device of [A3] is configured to receive energy from a photovoltaic module.

[A5] In some embodiments, the short-duration energy storage device of any of [A1] through [A4] provides an RTE that is greater than that of the ORC generator receiving heat from the high temperature heat source and exhausting heat to the ambient temperature heat sink.

[A5bis] In some embodiments, the short-duration energy storage device of any of [A1] through [A4] provides an RTE that is greater than 0.65

[A6] In some embodiments, the ambient temperature heat sink includes an ambient water thermal mass.

[A7] In some embodiments, the system of any of [A1] through [A6] includes a first generator working fluid conduit configured to flow generator working fluid from the ORC generator to the solar thermal collector, and a second generator working fluid conduit configured to flow hot generator working fluid from the solar thermal collector to the ORC generator.

[A8] In some embodiments, the system of [A7] is selectively operable in a first mode in which the high temperature heat source heats the generator working fluid and in a second mode in which the solar thermal collector directly heats the generator working fluid.

[A9] In some embodiments, the PV module is supported by a PV module tower. In some embodiments, the solar collectors comprises at least one mirror that directs the sunlight to the PV module.

[A10] In some embodiments, the short-duration energy storage device of any of [A1] to [A9] includes a mechanical storage device such as a flywheel or a gravity-based storage device.

[A11] In some embodiment, the generator working fluid includes one or more of the following: n-butane, i-butane, ammonia or chlorine.

[A12] In some embodiments, the system of according to any of [A1] to [A11] further comprises a refrigeration system and a controller to control the refrigeration system based on a temperature sensor measurement. The refrigeration system may be configured to cool generator working fluid after the ambient temperature heat sink and provide cooled generator working fluid to the ORC generator and/or the refrigeration system is configured to selectively cool a thermal mass of the ambient temperature heat sink. The refrigeration system may be an electric refrigeration system and receives electrical power from the battery storage device.

[A13] In some embodiments, the short-duration energy storage device provides electrical power to a load, such as a local systems or the power grid.

[B1] In some embodiments, a system for providing electrical power includes a PV module, a high temperature heat source, an ambient temperature heat sink, an ORC generator, and one or more battery energy storage devices. The ORC generator includes a generator working fluid with a boiling temperature greater than an ambient temperature of the ambient temperature heat sink, and the generator working fluid receives heat from the high temperature heat source and exhausts heat to the ambient temperature heat sink. The one or more battery storage devices are configured to receive electricity from the PV module and the ORC generator.

[B2] In some embodiments, the high temperature heat source of [B1] includes a thermal storage fluid configured to receive heat from the PV module.

[B3] In some embodiments, wherein the thermal storage fluid of [B2] circulates in a PV module tower supporting the PV module to cool the PV module.

[B4] In some embodiments, the ORC generator of any of [B1] through [B3] is configured to deliver electricity to a generator battery storage device of the one or more battery storage devices.

[B5] In some embodiments, the generator battery storage device of [B4] is the battery storage device configured to receive electricity from the PV module.

[B6] In some embodiments, the system of any of [B1] through [B5] includes a refrigeration system and a controller to control the refrigeration system based on a temperature sensor measurement.

[B7] In some embodiments, the refrigeration system [B6] is configured to cool generator working fluid after the ambient temperature heat sink and provide cooled generator working fluid to the ORC generator.

[B8] In some embodiments, the refrigeration system of [B6] is configured to selectively cool a thermal mass of the ambient temperature heat sink.

[B9] In some embodiments, the refrigeration system of [B6] is an electric refrigeration system and receives electrical power from the battery storage device.

[B10] In some embodiments, the short-duration energy storage device of any of [B1] through [B4] provides an RTE that is greater than that of the ORC generator receiving heat from the high temperature heat source and exhausting heat to the ambient temperature heat sink.

[B11] In some embodiments, the short-duration energy storage device of any of [B1] through [B10] provides an RTE that is greater than 0.65.

[B12] In some embodiments, the PV module is supported by a PV module tower. In some embodiments, the solar collectors comprises at least one mirror that directs the sunlight to the PV module.

[B13] In some embodiments, the short-duration energy storage device of any of [B1] to [B12] includes a mechanical storage device such as a flywheel or a gravity-based storage device.

[B14] In some embodiment, the generator working fluid includes one or more of the following: n-butane, i-butane, ammonia or chlorine.

[B15] In some embodiments, the short-duration energy storage device provides electrical power to a load, such as a local systems or the power grid.

[B16] In some embodiments, the system of any of [B1] through [B15] includes a first generator working fluid conduit configured to flow generator working fluid from the ORC generator to the solar thermal collector, and a second generator working fluid conduit configured to flow hot generator working fluid from the solar thermal collector to the ORC generator.

[B17] In some embodiments, the system of [B16] is selectively operable in a first mode in which the high temperature heat source heats the generator working fluid and, in the second mode in which the solar thermal collector directly heats the generator working fluid.

[C1] In some embodiments, a method of providing electrical power includes generating photovoltaic (PV) electrical power with a PV module, providing the PV electrical power to one or more short-duration energy storage devices, collecting heat from sunlight; heating a generator working fluid with the heat, generating organic Rankine cycle (ORC) electrical power in an ORC generator, providing the ORC electrical power to one or more short-duration energy storage devices, and cooling the generator working fluid with an ambient temperature heat sink.

[C2] In some embodiments, collecting heat from sunlight of [C1] includes heating a high temperature heat source with the sunlight and heating the generator working fluid includes heating the generator working fluid with the high temperature heat source.

[C3] In some embodiments, heating the generator working fluid of [C1] includes circulating the generator working fluid through a portion of the PV module or a support structure supporting the PV module.

[C4] In some embodiments, the method includes powering a load using the electrical power stored in the short-duration energy storage devices.

[C5] In some embodiments, heating the generator fluid of [C1] to [C4] includes flowing the generator working fluid from the ORC generator to the solar thermal collector, and flowing a hot generator working fluid from the solar thermal collector to the ORC generator.

[C6] In some embodiments, the method of [C5] includes selecting a mode of operation between a first and second mode of operation wherein, in the first mode of operation, the high temperature heat source heats the generator working fluid and, in the second mode, the solar thermal collector directly heats the generator working fluid.

[C7] In some embodiments, the method of [C1] to [C6] includes cooling the generator working fluid based on a temperature sensor measurement. The generator working fluid may be cooled directly after the ambient temperature heat sink and/or cooling the generator working fluid may include cooling a thermal mass of the ambient temperature sink.

The method of [C1] to [C4] can be implemented with any of the systems disclosed in [A1]-[A13] and [B1]-[B17].

It should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein, to the extent such features are not described as being mutually exclusive. Numbers, percentages, ratios, or other values stated herein are intended to include that value, and also other values that are "about", "substantially", or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims. The described embodiments are therefore to be considered as illustrative and not restrictive, and the scope of the disclosure is indicated by the appended claims rather than by the foregoing description.

What is claimed is:

1. A system for providing electrical power, the system comprising:

a high temperature heat source;

an ambient temperature heat sink;

an organic Rankine cycle (ORC) generator including a generator working fluid with a boiling temperature greater than an ambient temperature of the ambient temperature heat sink, and wherein the generator working fluid receives heat from the high temperature heat source and exhausts heat to the ambient temperature heat sink;

a solar thermal collector in thermal communication with the high temperature heat source to heat the high temperature heat source, wherein the solar thermal collector includes a photovoltaic (PV) module, and the solar thermal collector is configured to convert a first portion of sunlight to thermal energy and provide the thermal energy to the high temperature heat source and a second portion of the sunlight to electrical energy; and one or more short-duration energy storage devices configured to receive electrical energy from both of the ORC generator and the PV module.

2. The system of claim 1, wherein the high temperature heat source is a high temperature thermal storage.

3. The system of claim 1, wherein at least one of the one or more short-duration energy storage devices is a battery storage device comprising at least a battery cell.

4. The system of claim 3, wherein the battery storage device is configured to receive energy from the photovoltaic module.

5. The system of claim 1, wherein the one or more short-duration energy storage devices provides an RTE that is greater than that of the ORC generator receiving heat from the high temperature heat source and exhausting heat to the ambient temperature heat sink.

6. The system of claim 1, wherein the ambient temperature heat sink includes an ambient water thermal mass.

7. The system of claim 1, further comprising:

a first generator working fluid conduit configured to flow the generator working fluid from the ORC generator to the solar thermal collector; and a second generator working fluid conduit configured to flow hot generator working fluid from the solar thermal collector to the ORC generator.

8. The system of claim 7, wherein the system is selectively operable in a first mode in which the high temperature heat source heats the generator working fluid and in a second mode in which the solar thermal collector directly heats the generator working fluid.

9. The system of claim 1, wherein at least one of the one or more short-duration energy storage devices includes a mechanical storage device.

10. The system of claim 1, wherein the generator working fluid includes one or more of the following: n-butane, i-butane, ammonia, or chlorine.

* * * * *